United States Patent [19]  
Wilson et al.

[11] Patent Number: 4,635,819  
[45] Date of Patent: * Jan. 13, 1987

[54] APPARATUS AND METHOD FOR IMPROVING THE ACCURACY OF A LOSS-IN-WEIGHT FEEDING SYSTEM

[75] Inventors: David H. Wilson; James M. Loe, both of Scottsdale, Ariz.

[73] Assignee: K-Tron International, Inc., Scottsdale, Ariz.

[*] Notice: The portion of the term of this patent subsequent to Jun. 25, 2002 has been disclaimed.

[21] Appl. No.: 713,749

[22] Filed: Mar. 19, 1985

Related U.S. Application Data

[63] Continuation of Ser. No. 343,143, Jan. 28, 1982, Pat. No. 4,524,886.

[51] Int. Cl.[4] ............................................. G01G 11/08
[52] U.S. Cl. ........................................ 222/58; 222/63; 364/479
[58] Field of Search .................... 222/56, 58, 63, 77; 364/479; 177/121

[56] References Cited

U.S. PATENT DOCUMENTS

| 3,319,828 | 5/1967 | Maxwell . |
| 3,329,311 | 7/1967 | Goff et al. . |
| 3,494,507 | 7/1966 | Ricciardi . |
| 3,532,253 | 10/1970 | Godwin . |
| 3,873,002 | 3/1975 | Davidson et al. . |
| 3,889,848 | 6/1975 | Ricciardi et al. . |
| 3,967,758 | 7/1976 | Ferrara . |
| 4,054,784 | 10/1977 | Ricciardi et al. . |
| 4,065,031 | 12/1977 | Wiggins et al. . |
| 4,111,336 | 9/1978 | Ward et al. . |
| 4,330,855 | 3/1982 | Ricciardi et al. . |
| 4,458,827 | 7/1984 | Stelte ................. 222/63 X |
| 4,524,886 | 6/1985 | Wilson et al. .......... 222/58 |

FOREIGN PATENT DOCUMENTS

| 52830 | 4/1980 | Japan . |
| 349898 | 12/1972 | U.S.S.R. . |
| 381063 | 8/1973 | U.S.S.R. . |

Primary Examiner—Joseph J. Rolla  
Assistant Examiner—Frederick R. Handren  
Attorney, Agent, or Firm—Parkhurst & Oliff

[57] ABSTRACT

A control for loss-in-weight feeders which decreases flow error during refill of the feeder hopper. The weight range (empty to full capacity) of the hopper is divided into weight increments. Samples are taken of the hopper weight during discharge and refill, and each sample is assigned to a weight increment. During discharge, a scale factor related to the density of material in the hopper is computed, assigned to a weight increment and stored in memory; and the hopper feed screw is driven at a speed proportional to the computed scale factor. During refill, the stored scale factors are retrieved from memory and the hopper feed screw is driven at a speed proportional to the stored scale factors; but no additional scale factors are calculated.

16 Claims, 4 Drawing Figures

4,635,819

APPARATUS AND METHOD FOR IMPROVING THE ACCURACY OF A LOSS-IN-WEIGHT FEEDING SYSTEM

This is a continuation of application Ser. No. 343,143 filed Jan. 28, 1982 now U.S. Pat. No. 4,524,886.

BACKGROUND OF THE INVENTION

Prior art loss-in-weight feeders suffer from a loss in feed rate accuracy during the refill cycle. This is believed to be caused primarily by material compaction in the feeder hopper as material is added to the hopper.

In a typical prior art loss-in-weight feeder, material having known density is introduced at a relatively rapid rate into the feeder hopper. The material is then exhausted from the hopper at a much slower rate. The period during which material is introduced into the hopper is referred to hereafter as "refill" or "refill cycle". The period during which material is exhausted from the hopper is referred to as "discharge" or "discharge cycle". A feed screw located at the bottom of the hopper is rotated at a speed so as to deliver material at a desired flow rate. At the very beginning of the refill cycle, when very little material is in the hopper, the mass flow rate will be correct since the density of material within the hopper will be within expected limits. As material is added to the hopper, the material near the bottom of the hopper compacts. This increases the effective material density, and the mass flow rate increases, producing a flow rate error.

SUMMARY OF THE INVENTION

The present invention is an apparatus and method for improving the accuracy of a loss-in-weight feeding system during refill. During discharge and refill, the weight of material in the feeding system hopper is periodically sampled, and a signal representative of the weight sample is generated. The sample weight is assigned to one of a plurality of weight increments. Each weight increment is a fraction of the hopper weight range, from empty to full weight. The fraction is the inverse of the number of weight increments selected. During discharge, a plurality of scale factors is calculated and stored in memory. Each scale factor is representative of the density of material in the hopper for a weight increment corresponding to the sample weight. The scale factors are repeatedly updated during successive discharge cycles. Between consecutive discharge cycles, the hopper is refilled. During refill, the feed screw motor speed is varied in proportion to the updated scale factors stored during a preceding discharge cycle.

This invention decreases the mass flow error during refill by driving the feed screw motor at a speed based on the varying density of material in the hopper. Hopper weight measurements made during refill need not be highly accurate. Weight measurements need only be accurate enough to determine what weight increment to select.

DETAILED DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figure 1:
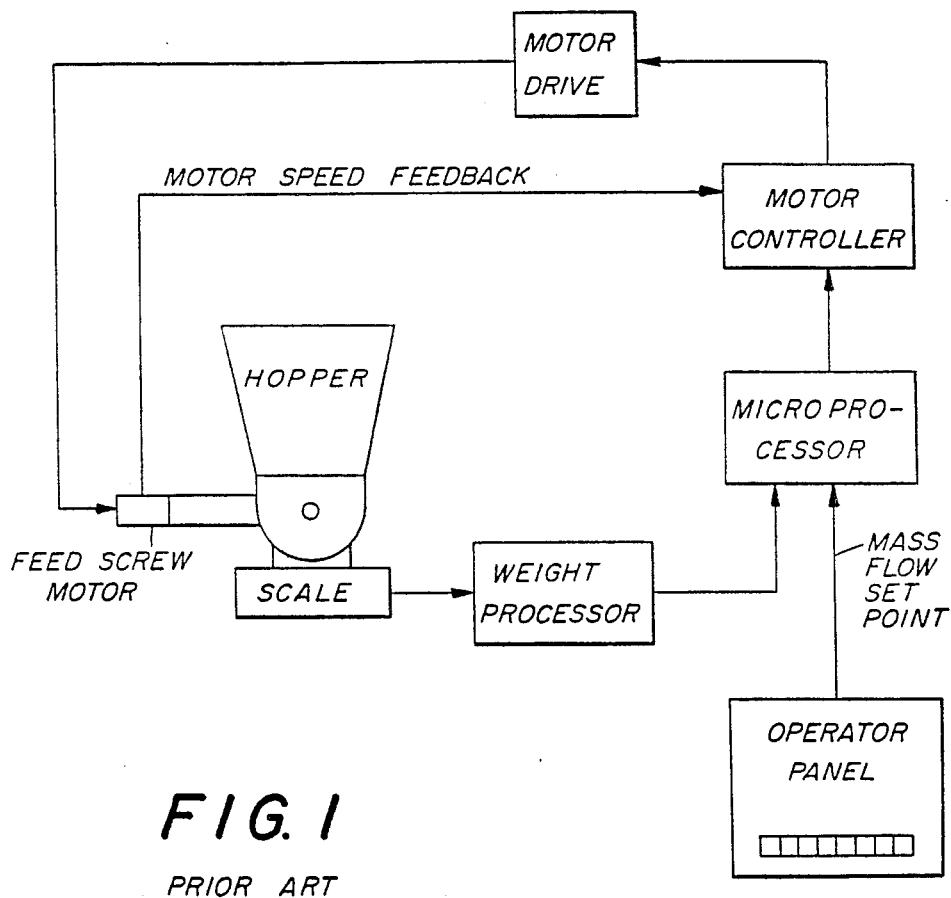
FIG. 1 is a simplified block diagram of a prior art loss-in-weight feeding system.

Referring to the drawings wherein like numerals indicate like elements, there is shown in FIG. 1 a simplified block diagram of a prior art loss-in-weight feeding system. Material is exhausted or discharged from a hopper by operation of a feed screw driven by a feed screw motor. The speed of the feed screw motor, and thus the mass flow rate (hereinafter "mass flow") of material discharged from the hopper, is controlled by a motor controller and associated motor drive in response to command signals from a programmed microprocessor. A desired or set point mass flow is selected by means of numerical switches on an operator panel. The panel includes conventional circuitry which generates a mass flow set point signal based on the setting of the switches. The signal comprises one input to the microprocessor. The other input to the microprocessor is a weight signal from the weight processor. The weight signal represents the current weight of material in the hopper. The speed of the feed screw motor is adjusted during discharge to deliver material at a substantially constant mass flow rate in response to the weight signal and the mass flow set point signal.

Problems develop during refill. When refill begins, the microprocessor changes automatically from the mass flow control mode wherein the feed screw motor speed is made proportional to mass flow error to the volumetric flow control mode wherein the feed screw motor speed is held substantially constant. In the volumetric control mode, the feed screw is operated to deliver a substantially constant volumetric flow of material. For an unchanging material density, this results in substantially constant mass flow. But during refill, there is a change in material density due to compaction of material in the feeder hopper. The change in density of material in the hopper is not accounted for by the prior art system. At a constant volumetric flow, this results in increased mass flow error.

The present invention eliminates this problem by varying the speed of the feed screw motor, in the volumetric control mode, to compensate for changing material density during refill.

Figure 2:
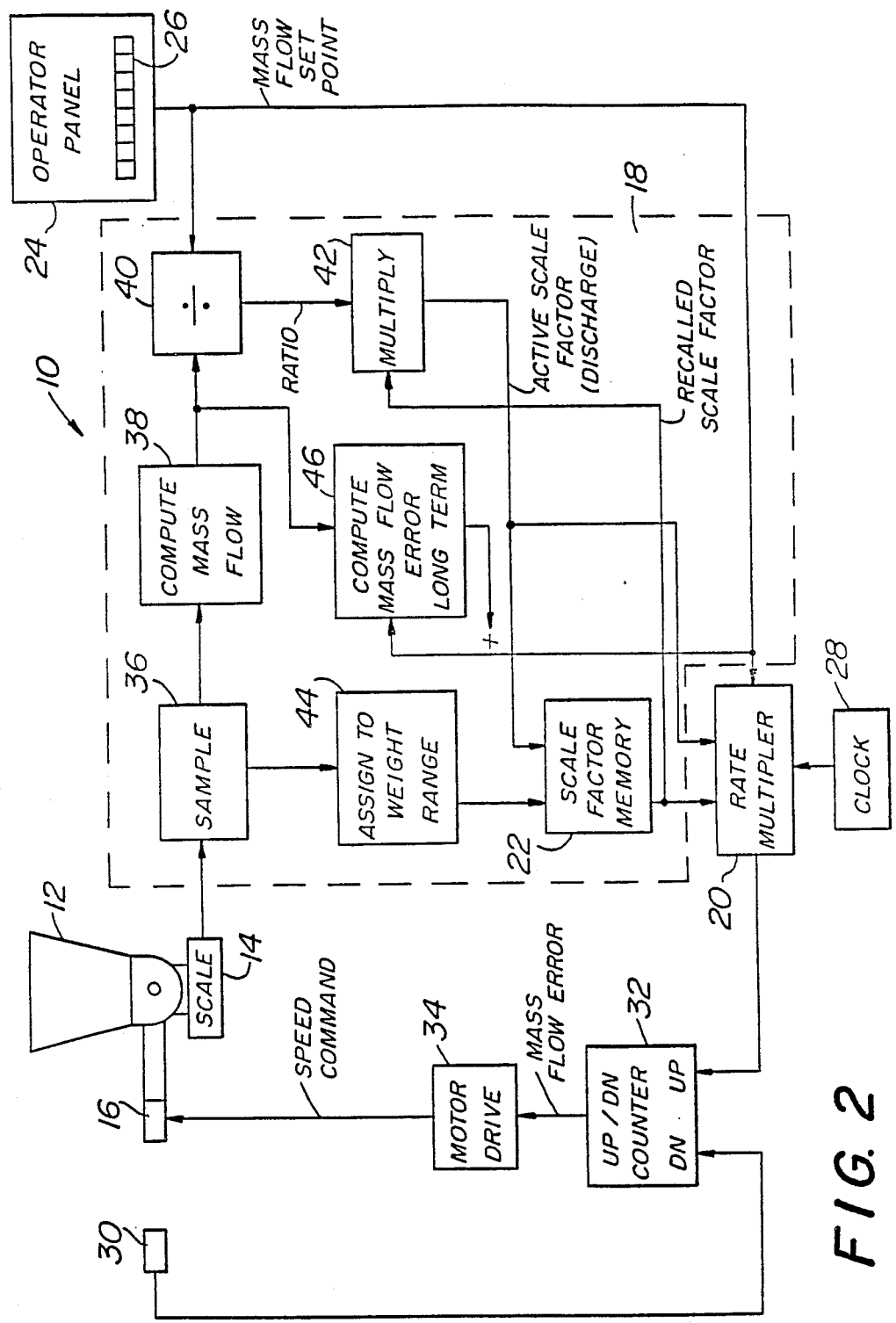
FIG. 2 is a simplified block diagram of the loss-in-weight feeding system in accordance with the present invention.

There is shown in FIG. 2 a simplified block diagram of a loss-in-weight feeding system 10 in accordance with the present invention. The system includes a conventional hopper feeder 12, a scale 14 and a drive motor 16 for the feed screw (not shown) within the hopper 12.

Loop Control

The system 10 utilizes a programmed microprocessor 18 which provides a three loop feedback control system. The primary and fastest loop drives the feed screw motor at a speed proportional to the frequency of a pulse train signal generated by a rate multiplier 20. The input to the rate multipler 20 is a digital word which is the product of the mass flow set point signal and a scale factor stored in memory 22. Computation of the scale factor is described in detail below. The mass flow set point signal is a digital word representative of the desired mass flow. The signal is generated in conventional manner at the output of an operator panel 24 based on an operator setting for thumbwheel switches 26. The other input to the rate multiplier is a fixed frequency pulse train generated by a clock 28. The frequency of the rate multiplier pulse train output is the fixed frequency of the clock pulse train multiplied by the product of the scale factor and mass flow set point. The primary loop is closed by a tachometer 30, which generates a pulse train signal having a frequency proportional to the feed screw speed, and an up/down counter 32 which is shown as a hardware element external to the microprocessor 18 but which may be part of the microprocessor software if desired. The up/down counter 32 counts up the rate multiplier output pulses and counts down the tachometer pulses. The net count is representative of mass flow error. The mass flow error signal generated by the counter commands the motor drive 34 which generates the speed command signal for the drive motor 16.

The secondary loop, which is a multiplicative servo loop slower than the primary loop described above, calculates and stores the scale factors which are used to compensate for mass flow error induced by compaction of hopper material during refill. A sampling circuit 36 periodically samples the weight signal generated by scale 14. The sample weight signal generated by sampling circuit 36 is used to compute or update a scale factor and to address the memory 22 so as to store the scale factor at the appropriate address. Storage of the scale factors at the appropriate addresses is described more fully hereafter. During discharge, the scale factors are calculated or updated by a compute mass flow circuit 38, a division circuit 40, and a multiplier circuit 42. Computation of mass flow is based on successive weight samples as described more fully hereafter. Division circuit 40 calculates the ratio of mass flow set point to the computed mass flow. This ratio provides an indication of effective material density during a subsequent refill cycle for each weight increment in the hopper weight range. As will be explained hereafter, the ratio calculation is made for each weight sample taken during discharge. An assign to weight range circuit 44 assigns each weight sample to a weight increment. Each weight increment corresponds to an address of the scale factor memory 22. The calculated or updated scale factor (termed "active" scale factor) is then stored in the memory 22.

During each refill cycle, the scale factors are retrieved from memory and sent to the rate multiplier circuit 20. Appropriate microprocessor logic circuitry (not shown) is supplied to direct the system through the primary and secondary loops as described more fully below in connection with the system flow charts in FIGS. 3A and 3B. The output of counter 32 during each refill cycle is thereby compensated for changing material density.

The third and slowest loop within the system minimizes long term error. The loop includes a compute mass flow error circuit 46 which computes long term mass flow error, i.e. the difference between computed mass flow and mass flow set point multiplied by time. The long term mass flow error is added to the mass flow error generated in the primary loop.

The scale factor memory 22 is arranged to hold any desired number of scale factors. Each scale factor is stored at the appropriate weight increment address. At present, ten weight increments (hence ten scale factors) are preferred as a reasonable value which provides suitable accuracy, but any number other than ten may be selected.

System Operation

Figure 3A:
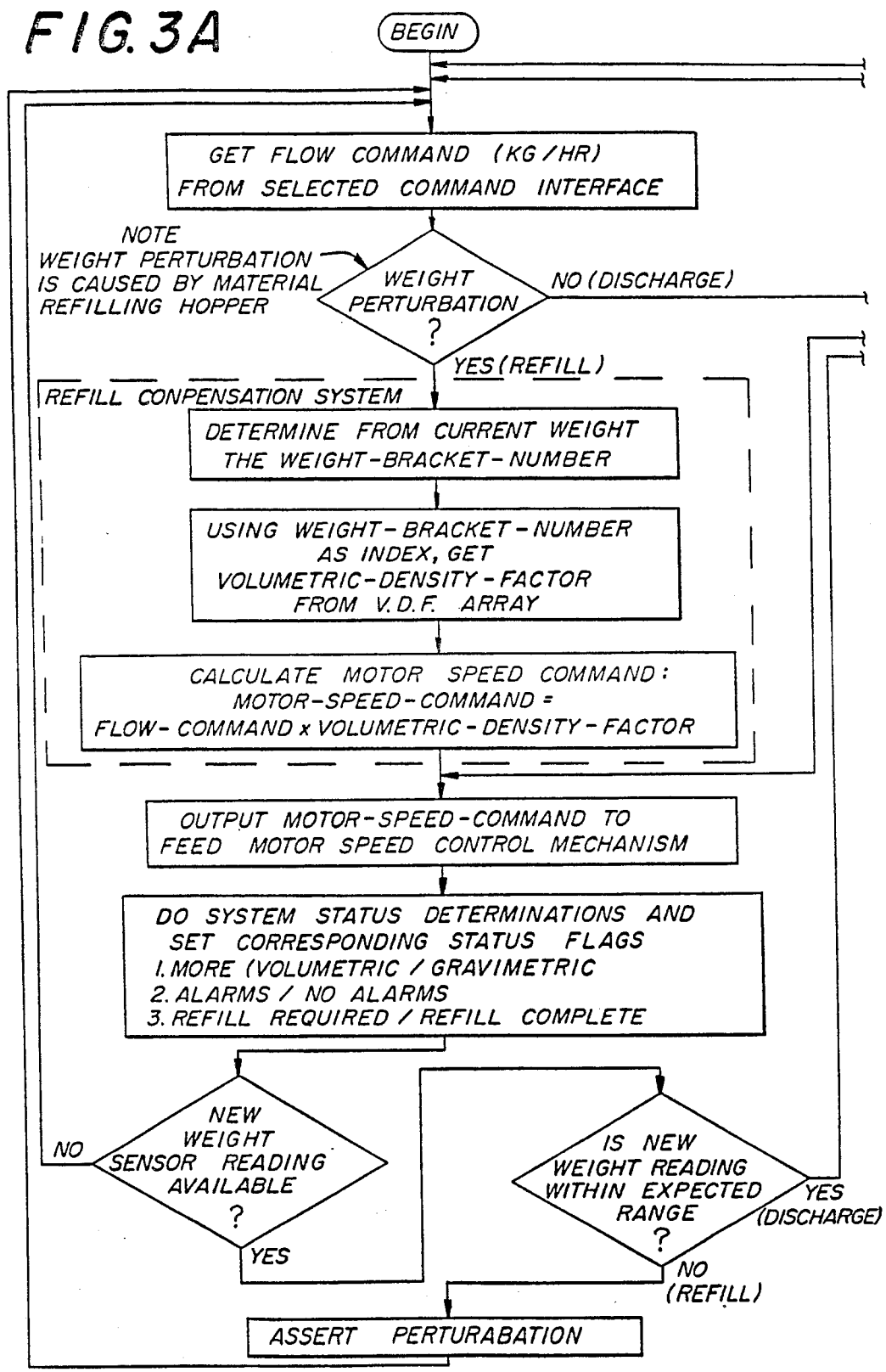
FIGS. 3A and 3B are flow charts illustrating the operation of the loss-in-weight feeding system shown in FIG. 2.
Figure 3B:
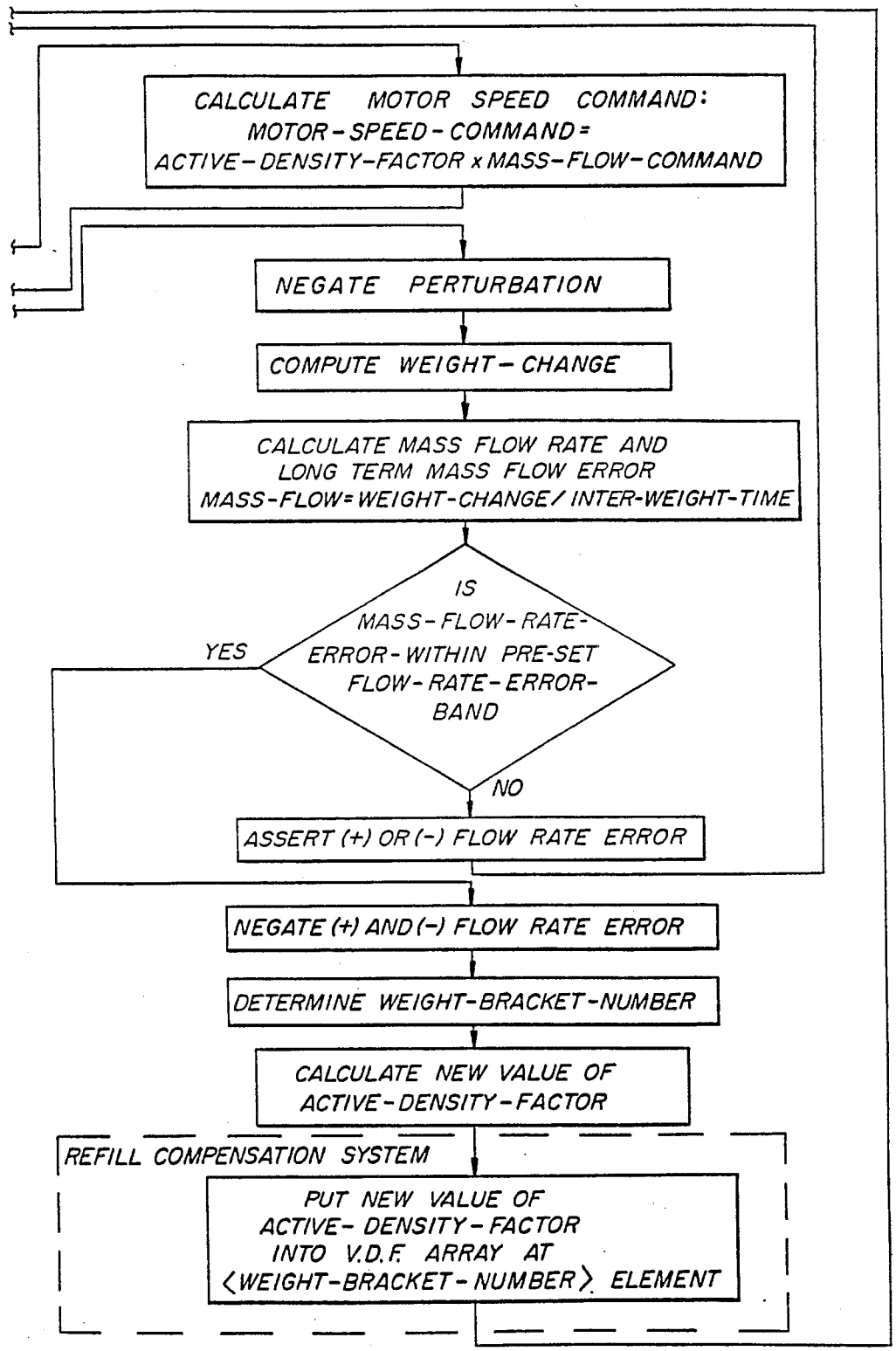

Details of the system operation are best understood by referring to FIGS. 3A and 3B. At the beginning of discharge, the mass flow set point signal, selected by manipulation of thumbwheel switches 26 at the operator panel 24, is detected by microprocessor 18 (GET FLOW COMMAND KG/HR). The microprocessor then checks whether a predetermined weight perturbation has been sensed (WEIGHT PERTURBATION?). The predetermined weight perturbation is sensed by computing the change in weight between successive weight samples. As described more fully below, an increase in weight beyond a predetermined limit is regarded as the weight perturbation (IS NEW WEIGHT READING WITHIN EXPECTED RANGE?), and a weight perturbation indicates a refill operation. If no weight perturbation has been sensed, this indicates that material is being discharged without refill.

During the discharge cycle, the program branches to the CALCULATE MOTOR SPEED COMMAND block wherein the motor speed command is based on multiplication of the "active" scale factor by the mass flow set point and fixed frequency clock signal (rate multiplier 20). The feed screw motor 16 is driven in response to the counter 32 output (OUTPUT MOTOR SPEED COMMAND). Counter 32 counts up the rate multiplier output pulses and counts down the tachometer pulses as previously explained.

If a weight perturbation has been sensed, indicating that the hopper is being refilled, the program enters the REFILL COMPENSATION routine indicated in dashed lines. The current weight sample is assigned to one of the aforesaid weight increments (DETERMINE FROM CURRENT WEIGHT THE WEIGHT BRACKET NUMBER). For the assigned weight increment, the corresponding scale factor is recalled from memory (USING WEIGHT BRACKET NUMBER AS INDEX GET VOLUMETRIC DENSITY FACTOR FROM VDF ARRAY) and then multiplied by the mass flow set point signal (CALCULATE MOTOR SPEED COMMAND). The product is used by rate multiplier 20 to modify the frequency of the clock pulse train. The rate multiplier output pulses are fed to the up terminal of pulse counter 32 (OUTPUT MOTOR SPEED COMMAND). The mass flow error signal generated by the counter determines the drive motor speed.

A new sample of the hopper weight is then taken (NEW WEIGHT SENSOR READING AVAILABLE?). If the new sample weight reading is not within an expected predetermined range of the prior sample (IS NEW WEIGHT READING WITHIN EXPECTED RANGE?), a weight perturbation is detected (ASSERT PERTURBATION) and the foregoing operations are repeated in the REFILL COMPENSATION routine. If the new weight sample is within an expected predetermined range of the prior sample, no perturbation is detected (NEGATE PERTURBATION), indicating a discharge cycle rather than a refill cycle. The change between weight samples is computed (COMPUTE WEIGHT CHANGE), and the mass flow and long term mass flow error are computed (CALCU-

LATE MASS FLOW RATE ... AND LONG TERM MASS FLOW ERROR).

The mass flow error is computed by circuit 46 as the difference between the mass flow set point and computed mass flow. If the mass flow error is within a preset error band (IS MASS FLOW RATE ERROR WITHIN PRESET FLOW RATE ERROR BAND?), the error is not displayed (NEGATE MASS FLOW RATE ERROR) and the weight sample is assigned to a weight increment (DETERMINE WEIGHT BRACKET NUMBER). An "active" scale factor is then calculated (CALCULATE NEW VALUE OF ACTIVE DENSITY FACTOR) and stored in memory for that same weight increment in replacement of the previously stored scale factor (PUT NEW VALUE OF ACTIVE DENSITY FACTOR INTO VDF ARRAY ...). The "active" scale factor is updated to reflect the change in material density due to the change in hopper weight. The "active" scale factor is then employed to generate the feed screw motor speed command signal (CALCULATE MOTOR SPEED COMMAND), as already explained, until a new sample weight is available. Should the mass flow error exceed the preset band for any weight sample during discharge, the mass flow error is displayed (ASSERT FLOW RATE ERROR) and the computed mass flow is not utilized to calculate an "active" density factor since the data is no longer considered reliable. The scale factors stored in memory remain as is.

From the foregoing, it should be appreciated that weight samples are repeatedly taken and tested for a weight perturbation during a discharge cycle. Concurrently, scale factors stored in memory are repeatedly being recalled and replaced by "active" scale factors. During refill, however, the stored scale factors are recalled from memory and are used to generate the motor speed command without replacing any of the scale factors with "active" scale factors. An "active" scale factor is simply an updated stored scale factor, being the product of the stored scale factor (recalled from memory) and the ratio of mass flow set point to computed mass flow. Thus, the system employs an iterative technique wherein scale factors are recalled from memory during discharge cycle, multiplied by the ratio of mass flow set point to computed mass flow to produce an "active" scale factor, and replaced in memory by the "active" scale factor so computed. Between successive discharge cycles, the hopper is refilled. During each refill cycle, the stored scale factors are recalled from memory and employed to generate the rate multiplier output, but new "active" scale factors are not calculated. An active scale factor, being based on a computation of mass flow set point to computed mass flow during discharge, is indicative of the changing density of material in the hopper for each weight increment in the hopper weight range.

It should be noted that the scale factor memory 22 may be initially loaded, at all addresses, with the same arbitrary numbers. For example, each address may contain the number 1,000. During the first discharge cycle, these numbers are recalled from memory and multiplied by the ratio of the mass flow set point to computed mass flow to derive the first "active" scale factors. These "active" scale factors then replace the numbers initially stored in memory. During subsequent discharge cycles, these "active" scale factors are recalled from memory and replaced with new "active" scale factors by the iterative technique described.

An embodiment of the invention has been described in terms of a block diagram (FIG. 2) comprising certain circuits contained within a microprocessor. It should be noted that these circuits are merely representative of functional operations performed by conventional microprocessor internal circuity when the microprocessor is programmed as indicated by the flow charts depicted in FIGS. 3A and 3B. Equivalent hardware circuits could, however, be substituted for the programmed microprocessor without exceeding the spirit or scope of the invention.

The present invention may be embodied in other specific forms without departing from the spirit or essential attributes thereof and, accordingly, reference should be made to the appended claims, rather than to the foregoing specification, as indicating the scope of the invention.

We claim:

1. A material feeding system comprising:
   means for storing a quantity of material;
   means for discharging said material from said means for storing during a first period and a second period, said material having an effective density which is dependent on the quantity of material in said storing means;
   means for generating a signal representing the effective density of material being discharged during said first period, said signal being different for different effective densities; and
   means responsive to the quantity of material in said storing means during said second period and to said signal for controlling said means for discharging during at least a portion of said second period to compensate for change of the effective density of the material being discharged.

2. A material feeding system comprising:
   means for storing a quantity of material;
   means for discharging said material from said means for storing during a first period and a second period;
   means for generating and storing a signal related to the discharge of material during said first period, said signal being different for different quantities of material stored; and
   means responsive to the quantity of material in said means for storing during said second period and to said stored signal for controlling said means for discharging during at least a portion of said second period.

3. A material feeding system comprising:
   means for storing a quantity of material;
   means for discharging said material from said means for storing during alternating first and second periods;
   means for refilling said means for storing during said second periods;
   means for generating and storing a signal related to the discharge of material during said first period, the discharge of material being different for different quantities of material stored; and
   means responsive to the quantity of material in said means for storing during said second period and to said stored signal for controlling said means for discharging during at least a portion of said second period.

4. A material feeding system comprising:
   means for storing a quantity of material;

means for discharging said material from said means for storing during a first and second period;

means for generating and storing a signal related to the discharge of material during said first period, said discharge of material being different for different quantities of material in said means for storing; and means responsive to the quantity of material in said storing means during said second period and to a signal derived from said stored signal for controlling said means for discharging during at least a portion of said second period.

5. A material feeding system comprising:
means for storing a quantity of material;
means for discharging said material from said means for storing during first and second periods;
means for sensing the weight of said quantity of material;
means for generating and storing a signal related to the discharge of material during said first period and related to said weight sensed during said first period; and
means responsive to the weight of material in said storing means during said second period and to a signal derived from said stored signal for controlling said means for discharging during at least a portion of said second period.

6. In a loss in weight feeding system including means for receiving a quantity of material and means for discharging said material during alternating first and second periods wherein the means for discharging is controlled to provide discharge at a predetermined mass flow rate during said first period and discharge at a volumetric flow rate during said second period, the improvement comprising:
means responsive to the weight of material during said first period for generating and storing a signal related to the discharge of material for a predetermined weight of the quantity of material; and
means responsive to the weight of material during said second period and to a signal derived from said stored signal for controlling said volumetric flow rate during said second period.

7. A method for feeding material comprising:
storing a quantity of material;
discharging said material from said stored quantity during alternating first and second periods;
generating and storing a signal related to the discharge of material during said first period; and
controlling said discharge during at least a portion of said second period in response to the quantity of material stored during said second period and a signal derived from said stored signal.

8. A method for feeding material comprising:
storing a quantity of material in a means for storing;
discharging said stored material from said means for storing during alternating first and second periods;
sensing the weight of material discharging during said first period;
computing the mass flow rate of material being discharged during said first period in response to said weight sensed during said first period and maintaining said mass flow rate at a selected value during said first period;
storing a signal related to the discharge of material during said first period, said signal being different for different rates of discharge;
refilling said means for storing during said second period;
sensing the weight of material in said means for storing during said second period; and
controlling said discharge during at least a portion of said second period in response to said weight sensed during said second period and to a signal derived from said stored signal.

9. A system as recited in claim 1 wherein said signal is in digital form.

10. A system as recited in claim 2 wherein said signal is in digital form.

11. A system as recited in claim 3 wherein said signal is in digital form.

12. A system as recited in claim 4 wherein said stored signal is in digital form.

13. A system as recited in claim 5 wherein said stored signal is in digital form.

14. In a loss in weight feeding system as recited in claim 9 wherein said stored signal is in digital form.

15. A method as recited in claim 7 wherein said stored signal is in digital form.

16. A method as recited in claim 8 wherein said stored signal is in digital form.

* * * * *